Patented Feb. 2, 1943

2,310,146

UNITED STATES PATENT OFFICE 2,310,146

MIXED ETHER-ESTERS OF CASHEW NUT-SHELL LIQUID AND PREPARATION

Solomon Caplan, New York, N. Y., assignor to The Harvel Corporation, a corporation of New Jersey No Drawing. Application November 28, 1939, Serial No. 306,495

7 Claims. (Cl. 260—473)

The present invention relates to methods and steps of transforming cashew nut shell liquid by the substitution of hydrocarbon radicles of the phenolic hydroxyl groups and for the hydrogen radicles of the carboxylic hydroxyl groups of the phenols present in cashew nut shell liquid, and the present invention also relates to the transformation products of the methods of the present invention and to cashew nut shell liquid in which a substantial part or all of said hydrogen radicles are replaced by hydrocarbon radicles.

The present invention is applicable and further relates to transformation products of mixtures of cashew nut shell liquid with other phenols such as carbolic acid, the cresols, the xylenols and cardanol. And the present invention also relates to transformation products obtained by substituting hydrocarbon radicles for a substantial part of the hydrogen radicles of the hydroxyl groups of the phenols of cashew nut shell liquid but for substantially less than for all of said hydrogen radicles. A substantial part is considered sufficient to make a noticeable difference in the transformation product or in the products in which the said transformation products are used as intermediate. An example of a substantial part is one-eighth of all the hydrogen radicles of the hydroxyl groups of the phenols of the cashew nut shell liquid being treated.

An object of the present invention is to provide transformation products of cashew nut shell liquid which have a degree of stability when subject to heat.

Cashew nut shell liquid in the raw state is composed substantially entirely of a mixture of cardol and anacardic acid, each of which is a phenol having a carboxylic group and having an unsaturated hydrocarbon substituent and a hydroxyl group on the aryl nucleus, and it is an object of the present invention to transform the cashew nut shell liquid by substituting a hydrocarbon radicle for the hydrogen radicles of the phenolic hydroxyl group and of the carboxylic hydroxyl group, either to completion or to a substantial degree.

Either raw cashew nut shell liquid or cashew nut shell liquid which has been somewhat modified is suitable for the practice of the present invention to make products for various uses. For example, cashew nut shell liquid which had been treated by the method of Patent 2,067,919 to Harvey and Damitz and which is in the liquid state can be modified to make ethers according to the present invention by substantially the same steps as used for making ethers of raw cashew nut shell liquid. According to said Patent 2,067,919 cashew nut shell liquid is treated with material such as sulphuric acid to throw out naturally occurring metals as salts which can be separated from the treated cashew nut shell liquid, also this patent describes the further use of the sulphuric acid to polymerize the cashew nut shell liquid to various stages and states among which are liquids which are suitable for the practice of the present invention.

Other forms of cashew nut shell liquid suitable for the practice of the present invention are the products of Patent 1,725,796 to Harvey in which cashew nut shell liquid has been modified by heating at various temperatures, to which patent reference is hereby made as part of the disclosure for the practice of the present invention.

Other examples of phenolic material suitable for use in the practice of the present invention are mixtures of cardanol with raw cashew nut shell liquid, with the phenolic materials of said Patent 2,067,919, with the phenolic materials of said Patent 1,725,796 and mixtures of any or all of the phenolic materials hereby disclosed, reference being hereby made also to said Patent 2,067,919 as part of the disclosure of the practice of the present invention.

Also the phenolic materials in marking nut shell liquid can be transformed by the methods of the present invention and any or all of the phenolic materials of marking nut shell liquid or modifications thereof can be subtracted from or added to each other to obtain proportions of the phenolic materials which naturally occur in marking nut shell liquid different from the proportions which naturally occur in marking nut shell liquid.

And marking nut shell liquid or any or all of the phenolic materials of marking nut shell liquid or phenols which are modifications thereof can be mixed with cashew nut shell liquid or any or all of the phenolic materials of cashew nut shell liquid or modifications thereof and can be submitted to the methods of the present invention for the substitution of hydrocarbon radicles for substantial proportions or all of the hydrogen radicles of the hydroxyl groups (phenolic and carboxylic) present therein.

Also the phenolic materials of japanese lac such as urushiol can be used alone with any or all of the phenolic materials of cashew nut shell liquid or marking nut shell liquid or modifications thereof in the practice of the present invention.

An example of the practice of the method of the present invention together with the product thereof is as follows:

*Example 1.*—Three thousand pounds of cashew nut shell liquid and about 1060 pounds of primary amyl chloride are placed in a tank having a steam jacket; a circulating pipe line loop from the bottom thereof, through a pump and then back to the upper part of said tank; and a pressure tight cover. About four hundred and fifty pounds of sodium hydroxide are dissolved in about two hundred and sixty gallons of water and the solution added to the ingredients in the tank.

The cover is then closed and tightened and the materials in the tank, by means of said pump, are looped through said pipe line for thorough mixing. By means of said steam jacket the temperature is brought up to about 325° F. and maintained there for about seven hours, the pressure in the tank accordingly being at 100 to 110 lbs. At the end of this time the steam is cut off the water jacket, the pump is stopped and the tank is left to cool over night at which time the temperature has dropped to about 250° F. to 275° and the pressure to about 40 lbs. and the water solution of sodium chloride and any unreacted sodium hydroxide has settled to the bottom of the tank. The salt solution drawn off and the pressure is relieved after which the reaction product is tested and neutralized for any alkalinity or acidity. A satisfactory condition for many purposes is slightly acid to methyl orange or phenyl red. The reaction product can then be heated to about 260° F. to drive off any water therein.

In like manner the ethyl derivative of cashew nut shell liquid can be made by using ethyl chloride instead of the amyl chloride, the amount of ethyl chloride used being molecularly proportional to the amount of amyl chloride used in the previous example. Likewise benzyl chloride and naphthyl chloride can be used for making the corresponding reaction products.

*Example 2.*—In another example the same procedure and steps are followed as in Example 1 except that about 2200 pounds of primary amyl chloride and a corresponding amount of sodium hydroxide are used.

*Example 3.*—In another example the same procedure and steps are followed as in Example 1 except that about 250 pounds of primary amyl chloride and a corresponding amount of sodium hydroxide are used.

*Example 4.*—In another example the same procedure and steps are followed as in Example 1 except that about 500 pounds of primary amyl chloride and a corresponding amount of sodium hydroxide are used.

*Example 5.*—In another example the same procedure and steps are followed as in Example 1 except that about seven hundred and fifty pounds of primary amyl chloride and a corresponding amount of sodium hydroxide are used.

*Example 6.*—In another example the same procedure and steps are followed as in Example 1 except that about three thousand pounds of primary amyl chloride and a corresponding amount of sodium hydroxide are used and one thousand five hundred (1500) pounds of cardanol are added to the cashew nut shell liquid at the beginning of the process and a correspondingly increased amount of sodium hydroxide is used, that is, about one thousand three hundred pounds.

The cashew nut shell liquid in the above examples in particular, and in other examples hereof in general, can be raw cashew nut shell liquid or any of the modifications thereof described herein and in said Patents 1,725,796 and 2,067,919. Also in each of the cases herein where it is desired to completely replace all of the hydrogen radicles of both the phenolic and carboxylic acid hydroxyl groups with hydrocarbon radicles, an excess of hydrocarbon ester of a mineral acid and an excess of sodium hydroxide (or its equivalent) can be used to insure complete replacement of the hydrogen radicles of the phenolic hydroxyl groups and carboxylic hydroxyl groups by hydrocarbon radicles.

*General examples.*—For the quantity of cashew nut shell liquid in each of the above examples the same quantity of marking nut shell liquid is used.

*Example 7.*—Monohydrocarbon and dihydrocarbon sulphate can also be used, in the presence of alkali, to produce hydrocarbon replacement of the hydrogen radicles of the phenolic and carboxylic hydroxyl groups of cashew nut shell liquid. Either dry, powdered alkali or solution, as in water, can be used. However when the alkali solution is used heating in a closed container is desirable in order to obtain the pressure and thereby the temperature needed to produce complete reaction of the dihydrocarbon sulphate with the cashew nut shell liquid, one of the hydrocarbon radicles being found to react at or below the boiling point of water under the conditions of the reaction and the other hydrocarbon radicles reacting above the boiling point of water. Monoethyl sulphate, diethyl sulphate, primary monopropyl sulphate and primary diethyl sulphate are illustrative examples of the hydrocarbon reagents suitable for use in making hydrocarbon ethers of cashew nut shell liquid, with the aid of an alkali such as sodium hydroxide, potassium hydroxide, calcium hydroxide, and so on. These reagents, hydrocarbon ester of mineral acid and sodium hydroxide (or equivalent) are used in amounts which are predetermined to produce the desired extent of replacement of hydrogen radicles by hydrocarbon radicles at the phenolic and carboxylic hydroxyl groups. And the same reagents can be used when marking nut shell liquid, japanese lac, urushiol, cardanol or any of the phenolic materials or mixtures are used as hereinabove set forth. In the practice of this example double the amount of hydrocarbon ester of mineral acid can be used if it is desired to omit the heating step in the use of the alkaline solution, in which case the reagents can be stirred in at room temperature.

Any heating that is produced as a result of the action of the reagents used in this example can be permitted to persist or can be reduced and controlled by artificial cooling to keep the temperature at about room temperature.

The reaction products of the present invention generally are ethers and esters of phenols having carboxyl groups and can be products in which either or both of the phenolic hydroxyl groups and the carboxylic hydroxyl groups have their hydrogen radicles replaced by hydrocarbon radicles. In some cases the hydrogen of the phenolic hydroxyl group will be replaced to a greater extent than the hydrogen of the carboxylic group. When cashew nut shell liquid, for example, is mixed with an alkaline solution in water and diethyl sulphate, the replacement of the hydrogen radicles of the phenolic hydroxyl group is almost immediate to a certain degree after which completion of the substitution of all the hydroxyl hydrogen radicles, including the hydrogen radicles of the carboxylic hydroxyl group, takes place in a space of time which can be from one-half hour to a number of hours depending on the temperature to which the reaction mixture is subjected.

Examples of hydrocarbon substituents suitable for use in the practice of the present invention are any of the aliphatic straight or branched chain radicles having from one to twenty carbon atoms and the various aryl and naphthyl radicles, without or with hydrocarbon substituents on their respective nuclei.

The products of the present invention are useful in the arts of resin making and of varnish making and can be mixed with drying oils and with phenols and phenol-aldehyde condensation to make varnishes and to make various types of resinous products including resin varnishes, molding resins, impregnating resins, filler resins, tank linings, electrical insulation, brake and clutch linings, rubber mixtures, plasticizers for cellulose nitrate and acetates and other cellulose esters and for vinyl resins and other resins.

The characteristic phenols described as being useful for the practice of the present invention and as having carboxyl groups and unsaturated hydrocarbon groups on the nuclei thereof are derived from the flora family Anacardiaceae but any other phenol of these characteristics whether of natural or artificial sources can be used. Generally these have from four to twenty-four carbon atoms in the unsaturated hydrocarbon substituents on the nuclei.

The present application is a continuation in part of my copending application Serial Number 143,495, filed May 19, 1937, Patent No. 2,240,034, April 29, 1941, and both directly and through the latter is a continuation in part of my application Serial Number 733,986, filed July 6, 1934, Patent No. 2,181,119, November 28, 1939.

In the term "hydrocarbon ester of a mineral acid" of the claims it is intended that the organic radicle of the ester is alkyl, aryl or aralkyl.

In the claims, the term "mixed hydrocarbon ether-ester" is intended to mean transformation products of the carboxylic acid phenols involved in which either one or both of the hydrogen atoms of the phenolic —OH group and the carboxylic acid —OH group has been replaced by an alkyl group, an aryl group or an aralkyl group.

Having thus described my invention, what I claim and desire to protect by Letters Patent is:

1. The method of producing mixed ether-esters which comprises bringing cashew nut shell liquid into contact with a hydrocarbon ester of a mineral acid under alkaline conditions, said ester of a mineral acid being present in amount substantially sufficient to supply a hydrocarbon radicle for each of the hydrogen radicles of the phenolic hydroxyl groups and the carboxylic hydroxyl groups of the anacardic acid and cardol substituents of cashew nut shell liquid.

2. The method which comprises transforming cashew nut shell liquid into mixed ether-esters by bringing cashew nut shell liquid into contact with a hydrocarbon ester of a mineral acid under alkaline conditions, said hydrocarbon ester of a mineral acid being used in amount substantially sufficient to substitute hydrocarbon radicles for the hydrogen radicles of the phenolic hydroxyl groups and the hydrogen radicles of the carboxylic hydroxy groups of the phenols present in the cashew nut shell liquid, and subsequently distilling to bring over as a distillate the transformed anacardic acid constituent of the cashew nut shell liquid.

3. The method which comprises transforming cashew nut shell liquid into mixed ether-esters by bringing cashew nut shell liquid into contact with a hydrocarbon ester of a mineral acid under alkaline condition, said hydrocarbon ester of a mineral acid being present substantially between the amount necessary to substitute hydrocarbon radicles for the hydrogen of the phenolic hydroxyl groups and the amount necessary to substitute hydrocarbon radicles for both the hydrogen radicles of the phenolic hydroxyl groups and the carboxylic hydroxyl groups of the phenols present in the cashew nut shell liquid.

4. Mixed hydrocarbon ether-esters of phenols having carboxyl groups and unsaturated hydrocarbon substituents on the nuclei thereof.

5. Mixed hydrocarbon ether-esters of carboxylic acid phenols having carboxyl groups and unsaturated hydrocarbon substituents on the nuclei thereof, said phenols being derived from the flora family Anacardiaceae.

6. The mixed alkyl ether-esters of the carboxylic acid phenols of cashew nut shell liquid.

7. Mixed ether-esters of the carboxylic acid phenols of material selected from the group consisting of cashew nut shell liquid, marking nut shell liquid, japanese lac, urushiol and cardanol.

SOLOMON CAPLAN.